US006322137B1

(12) United States Patent
Munsters

(10) Patent No.: US 6,322,137 B1
(45) Date of Patent: Nov. 27, 2001

(54) FOLDING ROOF FOR A VEHICLE

(75) Inventor: Paulus Johannes Wilheminus Munsters, Uden (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/616,162

(22) Filed: Jul. 14, 2000

(30) Foreign Application Priority Data

Jul. 15, 1999 (NL) .................................................. 1012609

(51) Int. Cl.$^7$ ......................................................... B60J 7/12
(52) U.S. Cl. ..................................... 296/219; 296/107.12
(58) Field of Search ............................... 296/219, 107.12

(56) References Cited

U.S. PATENT DOCUMENTS 1,786,662   12/1930   Leather .

FOREIGN PATENT DOCUMENTS

| 145013 | * | 5/1931 | (CH) | ..................................... | 296/219 |
| 0 376 203 | | 7/1990 | (EP) . | | |
| 694099 | * | 11/1930 | (FR) | ..................................... | 296/219 |

* cited by examiner

*Primary Examiner*—Dennis H. Pedder
(74) *Attorney, Agent, or Firm*—Westman, Champlin & Kelly, P.A.; S. Koehler

(57) ABSTRACT

A folding roof for a vehicle having an opening in its fixed roof comprises a stationary part to be fixed to the roof, which includes guide rails disposed at the longitudinal edges of the opening. An adjustable closure element supported by the frame is adjustable between a closed position, in which it closes the roof opening, and an open position, in which it releases the roof opening on the opening side. The closure element includes an operating beam extending in a transverse direction, which is connected to a drive device on the opening side, and a foldable cover attached thereto. The cover is supported by vertically adjustable second supporting bows, which are adjustably supported at their ends by connecting members. Tensioning elements are guided along said guide rails, which engage said second supporting bows via at least one point of engagement and which are connected to the drive device. The tensioning elements are tensioned when the cover is being closed, thereby exerting a downward force on the second supporting bows via said points of engagement. Each tensioning element is guided via an associated second sliding shoe on either side of the points of engagement of the second supporting bows, in such a manner that the tensioning element extends steeply adjacently to the point of engagement in the closed position of the cover.

9 Claims, 3 Drawing Sheets

FOLDING ROOF FOR A VEHICLE

BACKGROUND OF THE INVENTION

The invention relates to a folding roof for a vehicle. In a prior art embodiment of such a folding roof, tensioning elements in the form of tensioning wires extend alternately under first supporting bows and over second supporting bows. In this manner, the second supporting bows are loaded in a downward direction by the tensioning wires when the folding roof is in the closed position.

The object of the present invention is to provide an improved folding roof of the kind referred to in the introduction.

SUMMARY OF THE INVENTION

A folding roof for a vehicle having an opening in its fixed roof comprises a stationary part to be fixed to the roof, which includes guide rails disposed at the longitudinal edges of the opening. An adjustable closure element supported by the frame is adjustable between a closed position, in which it closes the roof opening, and an open position, in which it opens the roof opening. The closure element includes an operating beam extending in a transverse direction, which is connected to a foldable cover and a drive device. The cover is supported by vertically adjustable second supporting bows, which are adjustably supported at their ends by connecting members. Tensioning elements are guided along said guide rails, which engage said second supporting bows via at least one point of engagement and which are connected to said driving device. The tensioning elements are tensioned when the cover is being closed, thereby exerting a downward force on the second supporting bows via said points of engagement. Each tensioning element is guided via an associated second sliding shoe on either side of the points of engagement of the second supporting bows, in such a manner that the tensioning element extends steeply adjacently to the point of engagement in the closed position of the cover.

This manner of guiding the tensioning wires via second sliding shoes enables a better tensioning characteristic of the tensioning wires. Especially if the tensioning wires extend steeply adjacently to the points of engagement at the second supporting bows, a considerable part of the tensioning force in the tensioning wires will actually be used for exerting a downward force on the second supporting bows. This makes it possible to realise a better seal and a better protection against a possible break-in via the folding roof. Furthermore, the first supporting bows need not absorb any downward force from the tensioning elements in the closed position of the folding roof, as a result of which a better seal can be obtained at those locations as well.

BRIEF DESCRIPTION OF THE DRAWING

The invention will be explained in more detail hereafter with reference to the drawing, which schematically shows an exemplary embodiment of the folding roof according to the invention.

DETAILED DESCRIPTION OF THE ILLUSTRATIVE EMBODIMENT

Figure 1:
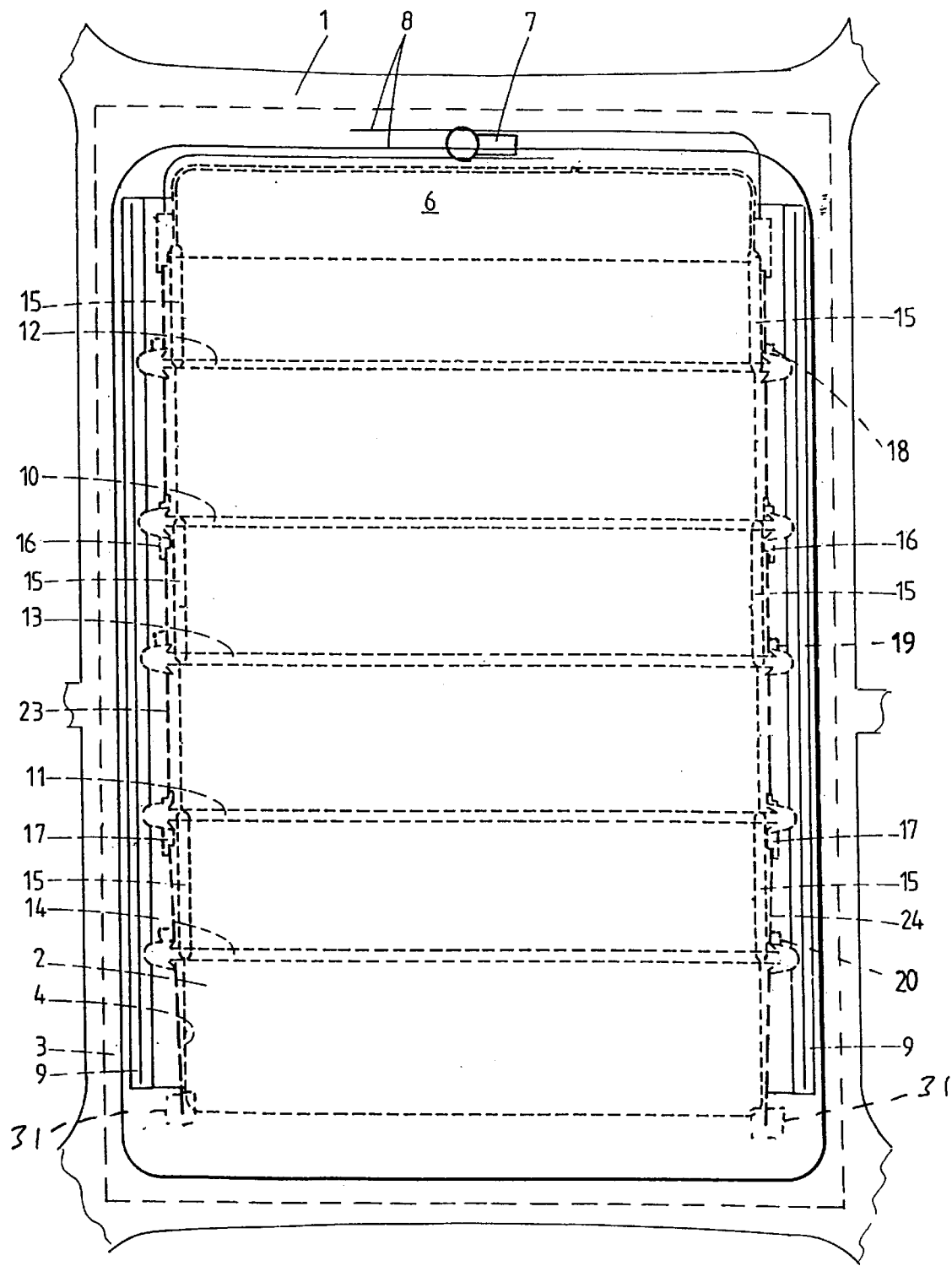
FIG. 1 is a very schematic top plan view of the exemplary embodiment of the folding roof according to the invention.

FIG. 1 shows a fixed roof 1 of a vehicle, in particular a passenger car, which is provided with a roof opening 2 for accommodating a folding roof. The folding roof comprises a stationary part, in this exemplary embodiment in the form of a window-shaped frame 3, which is attached to the fixed roof 1 and which circumferentially bounds a passage 4 of the folding roof.

Passage 4 can be selectively covered or opened by a foldable cover 5. In the illustrated embodiment, cover 5 is attached to frame 3 at the rear side of the vehicle, and at the front side said cover 5 is connected to a moveable operating beam 6 or the like. Operating beam 6 can be moved by a suitable operating mechanism. In the embodiment illustrated, an electric motor 7 and driving cables 8 operate as a drive device. This will not be discussed in more detail herein. The operating beam 6 is guided in guide rails 9 via sliding shoes at both ends. The guide rails 9 extend in a longitudinal direction of the vehicle on either side of passage 4.

In order to ensure that cover 5 is folded in a controlled manner when the folding roof is being opened, foldable cover 5 is supported by a number of supporting bows, two supporting bows 10, 11 of a first kind and three supporting bows 12, 13, 14 of a second kind in this embodiment. The supporting bows of the first and the second kind alternate along the longitudinal length of the opening 2. Hereinafter the supporting bows of the first and the second kind will also be referred to as first and second supporting bows.

Figure 2:
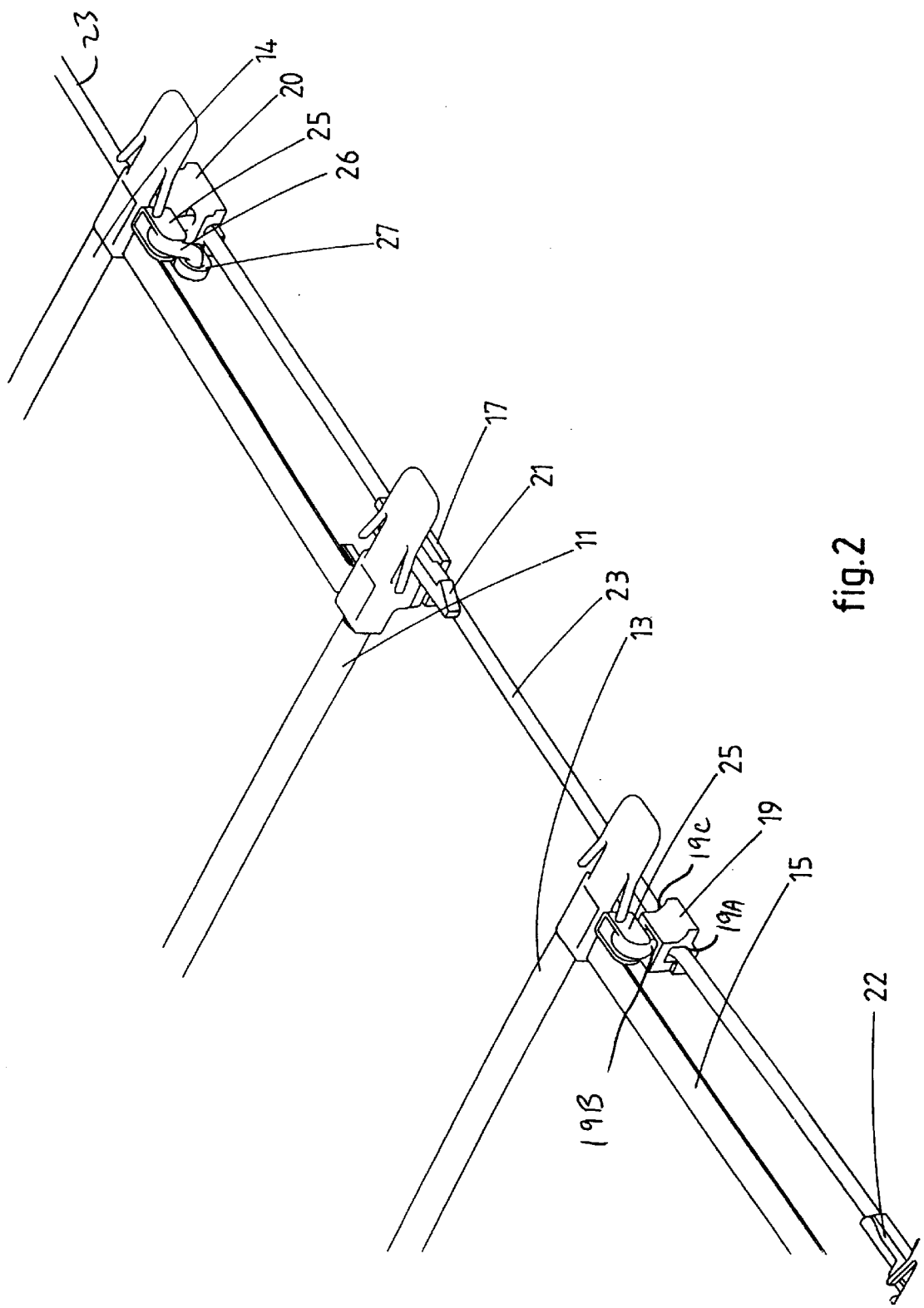
FIG. 2 is a larger-scale, perspective view of one end of the three rear supporting bows and the associated tensioning wire, in the closed position of the folding roof.
Figure 3:
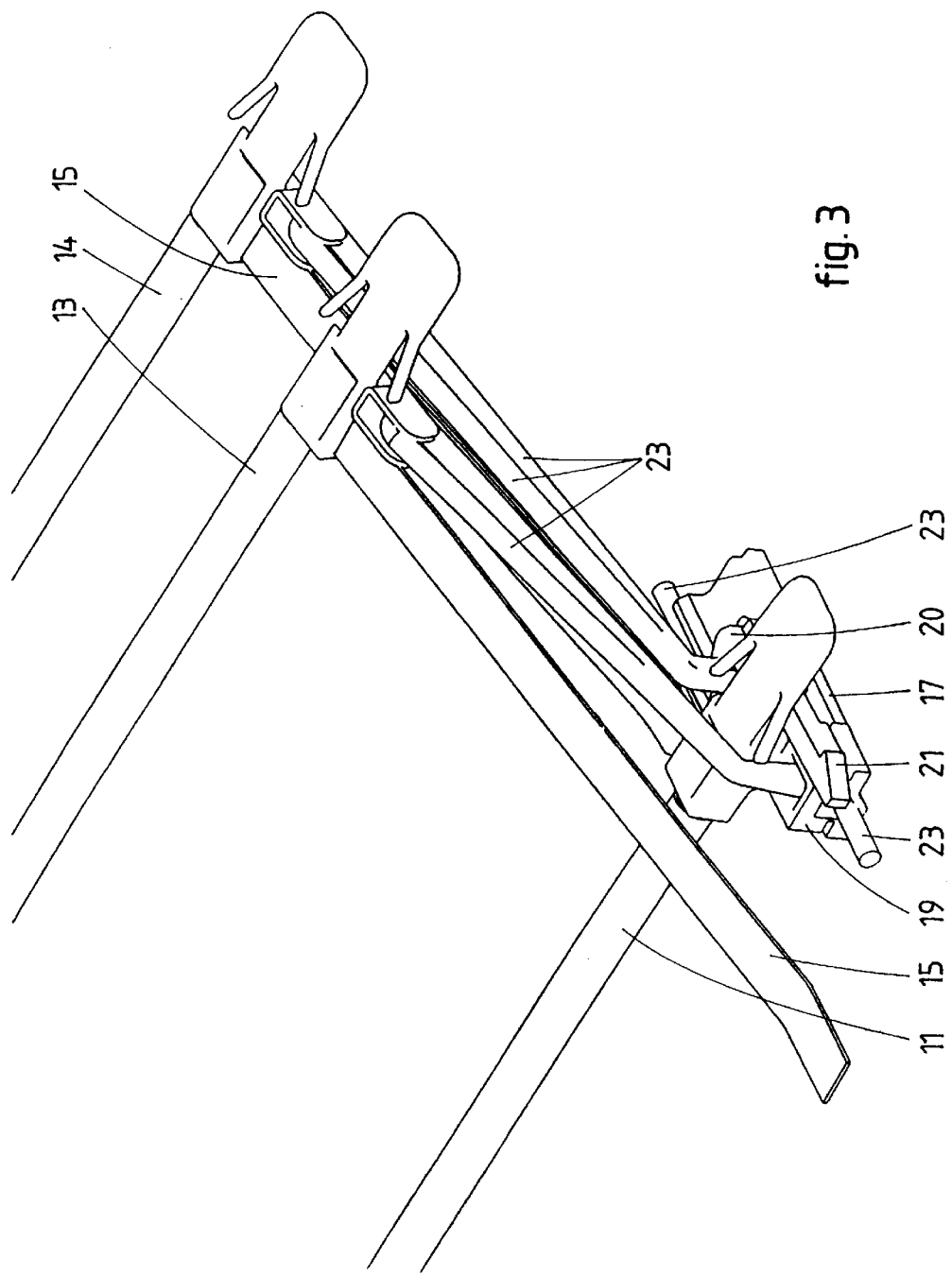
FIG. 3 is a perspective view of the supporting bows of FIG. 2 in the open position of the folding roof.

From FIG. 1, when viewed in combination with FIGS. 2 and 3, it can be appreciated that the second supporting bows 12, 13, 14 are vertically movable or free supporting bows, which are either connected, via arms 1S, to operating beam 6 (see second supporting bow 12) at both ends or to the preceding first supporting bow 10 or 11 (see second supporting bows 13 and 14). Arms 15 are resilient arms, which are biased in an upward direction.

When operating beam 6 and thus the front ends of the associated arms 15 are moved to the rear, the distance to the first supporting bow 10, which is connected to guide rail 9 by means of a connecting member 21, will decrease This results in some slackness in cover 5, which makes it possible for the supporting second supporting bow 12 to be pushed upward by arms 15. Eventually a rearwardly sloping fold will be formed in cover 5, with the second supporting bow 12 positioned at the top of said fold, and operating beam 6 will come into contact with first sliding shoes 16, which slidably support first supporting bow 10. The connecting member 21, which is in engagement with guide rail 9, will be disconnected from first sliding shoes 16 by means of a disconnecting element 22 of operating beam 6, as a result of which also the first supporting bow 10 will move rearwards. The same procedure will subsequently happen with the first supporting bow 11 and second supporting bows 13 and 14, so that eventually three folds will be formed in this schematic example.

FIGS. 1, 2 and 3 show that not only the first supporting bows 10 and 11 are fitted with first sliding shoes 16, 17, but that second sliding shoes 18, 19, 20 are provided near or proximate the second supporting bows 12, 13, 14, respectively. Said second sliding shoes 18, 19, 20 function to guide an elongated tensioning element in the form of tensioning wires 23 and 24, which are provided at respective longitudinal edges of passage 4. The front ends of tensioning wires 23, 24 are connected to the drive device, to operating beam 6 in the illustrated embodiment. Ends of tensioning wires 23, 24 remote from the drive device, the rear end in this case, are attached to frame 3, via an adjusting device 31 (FIG. 1), if necessary, by means of which the tensioning element can be adjusted and be readjusted in the course of the life of the folding roof. Tensioning wires 23 and 24 are intended to push the longitudinal edges of the cover firmly down onto the upper side of frame 3 in the closed position of the folding roof, which makes it possible to achieve a proper seal and protect against theft.

Each of the tensioning wires 23 and 24 are formed in loops proximate each of the second supporting bows 12, 13 and 14. The loops proximate second supporting bows 12 and 13 are identical. Referring to FIGS. 2 and 3 and supporting bow 13 by way of example, tensioning wire 23, which may be a plastic-coated steel cable, for example, is guided into an opening 19A of a second sliding shoe 19 from the front side near supporting bow 13, and subsequently out again through an opening 19B in the upper side of second sliding shoe 19. At that location, tensioning wire 23 is passed over a pin or pulley 25 near the end of second supporting bow 13, and subsequently back again through the opening 19B in the upper side of second sliding shoe 19, and finally out again through an opening 19C at the rear side of second sliding shoe 19. In this manner, a variable loop 26 is formed in tensioning wire 23 above second sliding shoe 19, which loop is passed over the pulley 25 of second supporting bow 13. The tensioning wires 23 and 24 are formed in loops in the same manner on second sliding shoes 18. Likewise, a similar technique takes place with second sliding shoe 20 at the rear second supporting bow 14, whereby loop 26 extends forward from the rear, however, and is passed through an eye 27 from pulley 25, as a result of which the tensioning wire 23 is moved in a lateral direction and led further rearwards in laterally deflected direction. This is done in order to have the tensioning wire 23 run outside a guiding groove in guide rail 9 behind second sliding shoe 20, so that it will not come into contact with further elements which are guided in the guiding groove in question.

As a result of the path of tensioning wires 23 and 24 through second sliding shoes 18, 19, 20 and, in the form of loops 26, over pulleys 25 of the associated supporting bows 12, 13, 14, the loops 26 will become larger or smaller upon movement of the operating beam 6 and thus of the front ends of tensioning wires 23 and 24. When the folding roof is being closed, the tensioning wires 23 and 24 will be tensioned as a result of the forward movement of the operating beam 6. Tensioning wires 23 and 24 are so dimensioned that a tensioning force will be produced in tensioning wired 23, 24 in the closed position of the folding roof. As a result of the presence of the loops 26, with the tensioning wires 23 and 24 extending substantially vertically adjacently to each pulley 25, the tensioning force in each of the tensioning wires 23 and 24 includes a large vertical component at that location. As a result of this design, a large part of the tensioning force is converted into a downward force on second supporting bows 12, 13, 14. As a result, the edges of cover 5 of the folding roof will be pushed tightly downwards against frame 3, thus providing an adequate seal and a proper protection against possible break-in. In addition, each tensioning wire 23, 24 extends between each of the second sliding shoes 18, 19 and 20 along a substantially straight path and through the location of first supporting bows 10, 11, with no upward force being produced on said first supporting bows 10, 11, as a result of which the tensioning wire does not oppose the sealing effect provided by cover 5.

From the foregoing it will be apparent that the invention provides a folding roof for a vehicle which is remarkable for the simple and adequate manner in which the edges of the cover are held down.

The invention is not limited to the embodiment as described above and shown in the drawing, which can be varied in several ways without departing from the scope of the invention. Thus the tensioning wires 23 and 24 could also be passed over the respective second supporting bows 12, 13 and 14 themselves. Furthermore it would be possible to pass the tensioning wires 23 and 24 over the first supporting bows 10 and 11 as well. Instead of tensioning wires 23 and 24, it is also possible to use other forms of elongated tensioning elements. The invention is also useful in folding roofs which do not have supporting bows, but which have a self-supporting cover, for example incorporating rigid stiffening plates. In that case, there will be folding elements only at the sides of the cover adjacent the guide rails. The invention can also be used with folding roofs which can be opened forwardly from the rear side of the opening.

What is claimed is:

1. A folding roof for a vehicle having an opening in its fixed roof, the folding roof comprising:

a stationary part to be fixed to the roof, which includes guide rails disposed at the longitudinal edges of the opening;

an adjustable closure element supported by said stationary part, which is adjustable between a closed position, in which it closes the roof opening, and an open position, in which it opens the roof opening on an opening side, wherein the closure element includes an operating beam extending in a transverse direction, which is connected to a drive device and a foldable cover attached thereto, wherein the cover is alternately supported by first supporting bows extending in the transverse direction, the first supporting bows being supported at their ends by first sliding shoes guided in said guide rails, as well as by vertically adjustable second supporting bows extending in the transverse direction, the second supporting bows being adjustably supported at their ends by connecting members, wherein elongated tensioning elements are guided along said guide rails, the tensioning elements engaging said second supporting bows via at least one point of engagement, the tensioning elements being operably connected to said drive device to tension the tensioning elements when the cover is being closed, thereby exerting a downward force on the second supporting bows via said points of engagement, and wherein each tensioning element is guided via an associated second sliding shoe along the guide rail on either side of the points of engagement of the second supporting bows such that the tensioning elements extend steeply adjacently to the point of engagements in the closed position of the cover.

2. The folding roof according to claim 1, wherein each tensioning element extends at least substantially vertically adjacently to each point of engagement in the closed position of the cover.

3. The folding roof according to claim 1, wherein each tensioning element is guided out of the respective second sliding shoes and passed over the associated points of engagement in the form of a loop.

4. A folding roof for a vehicle having an opening in its fixed roof, the folding roof comprising:

a stationary part to be fixed to the roof, which includes guide rails disposed at the longitudinal edges of the opening;

an adjustable closure element supported by said stationary part, which is adjustable between a closed position, in which it closes the roof opening, and an open position, in which it opens the roof opening on an opening side, wherein the closure element includes an operating beam extending in a transverse direction, which is connected to a drive device and a foldable cover attached thereto, wherein the cover is alternately supported by first supporting bows extending in the transverse direction, the first supporting bows being supported at their ends by first sliding shoes guided in said guide rails, as well as by vertically adjustable second supporting bows extending in the transverse direction, the second supporting bows being adjustably supported at their ends by connecting members, wherein elongated tensioning elements are guided along said guide rails, the tensioning elements engaging said second supporting bows via at least one point of engagement, the tensioning elements being operably connected to said drive device to tension the tensioning elements when the cover is being closed, thereby exerting a downward force on the second supporting bows via said points of engagement, and wherein each tensioning element is guided via an associated second sliding shoe on either side of the points of engagement of the second supporting bows such that the tensioning elements extend steeply adjacently to the point of engagements in the closed position of the cover, wherein each tensioning element is guided out of the respective second sliding shoes and passed over the associated points of engagement in the form of a loop, and wherein each point of engagement is in the form of a pulley-like element, which is disposed laterally of the associated second supporting bow.

5. The folding roof according to claim 1, wherein the second supporting bows are pivotally connected to a preceding first supporting bow and to the operating beam by an arm as the connecting member.

6. The folding roof according to claim 1, wherein the second sliding shoes are slidably guided in the respective guide rail, wherein the first sliding shoes are provided with the connecting members for connecting said first sliding shoes to said guide rails.

7. The folding roof according to claim 1, wherein each tensioning element is moved in a lateral direction at the rear second supporting bow and led further rearwards in laterally deflected direction.

8. The folding roof according to claim 1, wherein the tensioning elements are connected to said driving device at one end, whilst they are attached to the stationary part and the guide rails, respectively, via an adjusting device at the other end.

9. A folding roof for a vehicle having an opening in its fixed roof, the folding roof comprising:

a stationary part to be fixed to the roof, which includes guide rails present at the longitudinal edges of the opening;

an adjustable closure element supported by said stationary part, which is adjustable between a closed position, in which it closes the roof opening, and an open position, in which it opens the roof opening, wherein the closure element includes an operating beam extending in a transverse direction, which is connected to driving device and a foldable cover, which cover is supported at least by vertically adjustable folding elements, which are adjustably supported near the guide rails by connecting members, wherein elongated tensioning elements are guided along said guide rails, which engage said folding elements via at least one point of engagement and which are connected to said driving device, in such a manner that they are tensioned when the cover is being closed, thereby exerting a downward force on the folding elements via said points of engagement, and wherein each tensioning element is associated with a second sliding shoe that slidably guides the associated tensioning element along the guide rail on either side of the points of engagement of said folding elements in such a manner that each tensioning element extends steeply adjacently to the point of engagement in the closed position of the cover.

* * * * *